Sept. 29, 1936.  E. O. COREY  2,056,133
TERMINAL VALVE
Filed Nov. 14, 1935

INVENTOR.
Elmer O. Corey
BY
Wood & Wood
ATTORNEYS.

Patented Sept. 29, 1936

2,056,133

UNITED STATES PATENT OFFICE 2,056,133

TERMINAL VALVE

Elmer O. Corey, Norwood, Ohio, assignor to The Edna Brass Manufacturing Company, Cincinnati, Ohio, a corporation of Ohio Application November 14, 1935, Serial No. 49,799

4 Claims. (Cl. 277—42)

This invention relates to an improved valve, designated as a "terminal valve", primarily used in connection with a mechanical lubricant distributor for supplying lubricant under high or determined pressure to the part or parts to be lubricated. The terminal valve is particularly adaptable for use at the end of a lubricant distributing line, entering valves or cylinders which are under steam pressure.

A principal use for the terminal valves is upon locomotives, applied to all steam cylinders and valves to force oil into the cylinders and valves at a pressure in excess of the steam pressure in the cylinders and valves, to control the oil line pressure and prevent return of oil that has been forced by the ball checks; also to prevent strain from cylinders and valves entering the oil line which would condense and thus allow moisture to work back and in time fill the lubricant reservoir. The lubricant is supplied to the terminal valve by a pump. When the oil pressure in the terminal valve rises to a predetermined pressure, the terminal valve is opened to forcibly discharge a quantity of lubricant.

The terminal valve of the present invention overcomes objections to terminal valves known as a diaphragm type, now generally employed on locomotives, which require considerable attention and time to maintain them in proper working condition. The diaphragm type of terminal valve requires complete removal and disconnection from oil lines for the purpose of inspecting, cleaning, adjusting for a pressure setting, and testing. The present improved terminal valve permits inspection, cleaning, repairing and testing to be made without disassembling the valve body from its connected position. The terminal valve parts which require attention are combined and removable as a unit from the valve body without disturbing the body or disconnecting the same from the part with which it is connected for service, nor unfasten any pipe connections with the body.

An object of the invention is to provide a check valve primarily as a terminal for pressure feed lubricant distribution pipe lines, for controlling the discharge of lubricant of a determined pressure, with the valve elements contained within a cage and therewith assembled as a unit, accessible exteriorly of the valve body for insertion and removal without disturbing the body installation connections.

Another object of the invention is to provide a terminal valve with a plurality of spring-urged valve balls axially aligned within a passage, the balls of relatively different sizes and respectively urged against their seats by springs having relatively different tension, adapting one of the valve balls to be unseated independently and advancely of the second.

Various other features and advantages of the invention will be more fully set forth in the description of the accompanying drawing, in which.

Figure 1:
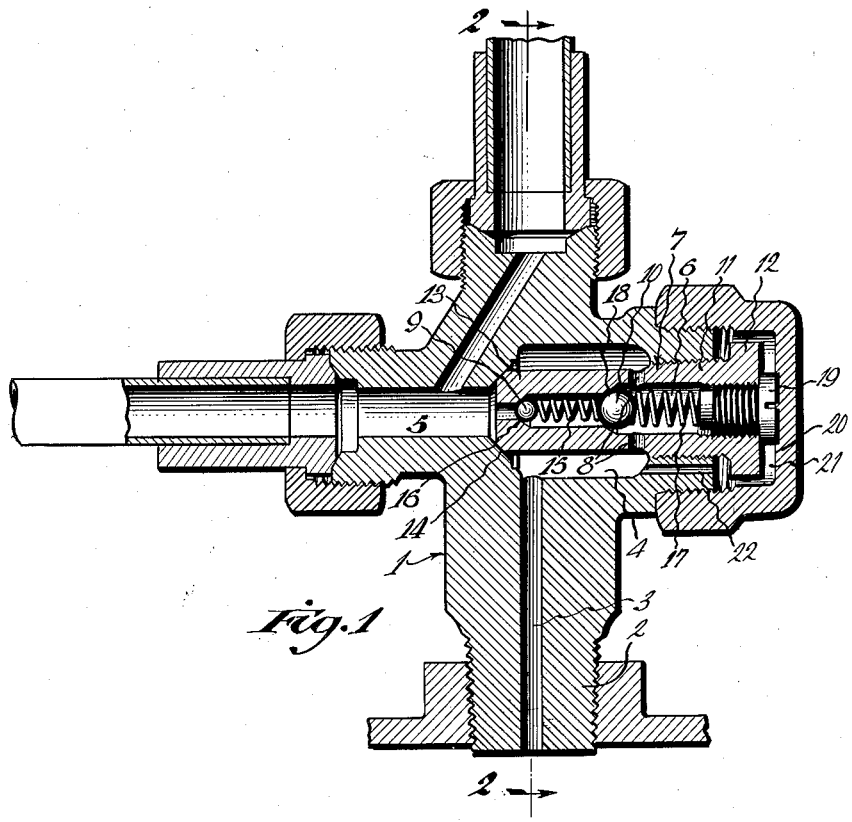
Figure 1 is a central vertical section through the improved terminal valve.
Figure 2:
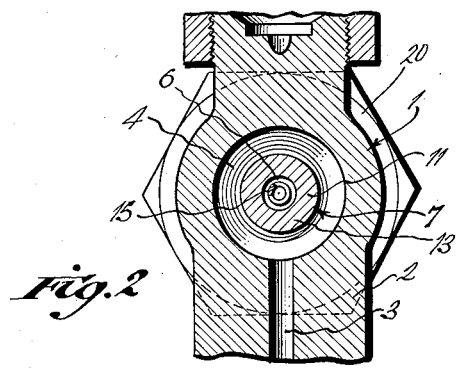
Figure 2 is a section on line 2—2, Figure 1.

Referring to the drawing, 1 indicates a valve body having a stem or nipple 2 externally screw-threaded at its outer end for connecting the body to a part to which the lubricant is to be supplied. The stem or nipple 2, axially or longitudinally, has a lubricant discharge bore or passage 3 open at its outer end and at its inner end in communication with a chamber 4 formed centrally within the body.

The chamber 4 communicates with an inlet passage 5 formed in the body through a double valve-controlled passage 6 within a valve cage 7, and through lateral ports 8—8 in the valve cage. The valve cage is in the form of a tubular, counter-turned plug with a bore longitudinally therethrough and of different diameters for various portions of its length to receive and seat relatively different diameter, spring-pressed valve balls 9, 10, for a plural and variable control of the fluid forced through said bore or passage 6.

The valve cage is engaged into the body and is removably secured therein, its forward end centrally projecting through the chamber 4 and in seating and sealing contact within an inner surface in the body, forming a side wall for the chamber 4. The cage constitutes a body portion 11, externally screw-threaded for removably connecting the same within the body and provided with a hexagon head 12 at the outer end thereof, accessible from the exterior of the body, and a stem or shank 13 extending from the opposite or inner end of the body portion 11, having its forward end tapered for seating into a conical port 14 formed in the valve body, connecting the chamber 4 with the inlet passage 5. The stem 13, when seated, provides a closure against direct communication between the chamber 4 and inlet passage 5.

The valve ball 9 is urged by a spring 15 against a conical seat 16 formed by counterboring the bore of the cage. One end of the spring engages the ball while its opposite end engages with the forward side of the second, larger diameter ball 10. Correspondingly, the ball 10 is urged by a spring 17 against a second conical seat 18 formed by a second counterbore of the bore of the cage and in axial alignment with the first seat 16. The spring 17, at one end, engages the ball 10 and at its opposite end engages a retainer screw 19 threaded in the outer end of the bore of the cage.

The retainer screw provides a plug or closure for the bore.

In an operation of the valve, the oil pressure, as delivered from a mechanical lubricator through a pipe or conduit connection with the terminal valve body, enters the passage 5 and forward port end of the bore in the cage, and, when the pressure is sufficient, unseats the valve 9 against the tension of spring 15. The spring 15, between the balls 9 and 10 when yielding to allow the ball 9 to unseat, will not exert sufficient pressure to unseat ball 10. When, however, the pressure between the balls equals or exceeds the pressure of spring 17, the ball 10 will be unseated and the oil discharged to the annular chamber 4 through lateral ports 8—8 in the cage and thence to passage 3 for distribution to the part to be lubricated.

The double ball check has the advantage, in the event of foreign matter lodging under one ball, that the second ball will hold the pressure, a subsequent impulse usually removing the obstruction when both checks again become operative, and by the combination of two balls and two springs, relatively of different size and tension, a predetermined pressure is always assured in the oil lines. Pressure can only drop below the predetermined degree when both valves are unseated, and if accidentally unseated a subsequent impulse of the pump usually clears one or both of the balls for a restoration of the parts.

Generally, upon bringing the retainer screw 19 in position within the end of the bore against the spring 17, the predetermined pressure is established without testing as both springs are of and have a known tension.

The valve balls and cage are preferably of a non-corrosive material and the springs of a heat resisting material to insure long life. The body is provided for making connections with two sizes of the pipe, one of which by-passes the valve, although it is obvious that other pipe connections may be embraced to meet various types of service.

By combining the valve balls and their closure springs within a cage and therewith, as a unit, removable from the body without disturbing the installation of the body with the part to be lubricated or to which the lubricant is to be distributed, and the supply pipe connections, inspection, cleaning, repairing and testing is conveniently and quickly accomplished. Repairs can be quickly made by merely removing the cage and substituting another. Therefore the apparatus need not be held up but for a few minutes to make repairs.

The valves and their springs, being assembled in their working positions within the cage, can be tested with the cage detached from the body and in a suitable test fixture. The terminal valve operates at a determined pressure, for which the parts are accurately set, thereby increasing the efficiency of the terminal valve. The terminal valve balls, normally being seated under pressure, will hold the oil line fully charged and under pressure so that operation of the terminal valve will be immediately effective upon the starting of the oil delivery pump, which, for locomotive lubrication, starts when the locomotive starts in motion.

The terminal valve is of simple construction, can be operated at a minimum cost of maintenance, is very durable and can be serviced by anyone.

The head end of the valve cage 12 is enclosed by a cap 20, screw-threaded upon the body, the connection being fluid tight. The spacing 21, formed by housing the head end of the valve cage, is open to communication with the chamber 4 through a reduced diameter passage 22. This prevents the trapping of any moisture in said spacing which otherwise might escape from the chamber 4 through the joint surfaces of the valve cage and body or valve cage and retaining screw 19, and thereby avoids making fluid tight joints between those connecting parts.

Having described my invention, I claim:

1. A terminal check valve for a lubrication distribution pipe line, comprising, a body having inlet and outlet passages formed therein and with which, respectively, supply and delivery connections are made, a tubular valve cage engaged into a side of the body intermediate of the inlet and outlet passages controllably connecting the same through a bore in said cage, the bore formed for respectively seating relatively different diameter ball valves in tandem, the cage accessible exteriorly of the body for insertion and removal without disturbing the body installation, a plurality of relatively different diameter spring-urged ball valves within said cage bore with the smaller diameter ball valve in advance of the other for initial unseating, and springs respectively for urging said valves against their seats, with the spring for the smaller valve engaged with the larger for conjointly influencing both valves.

2. A terminal check valve for a lubrication distribution pipe line comprising, a body having inlet and outlet passages formed therein and with which, respectively, supply and delivery connections are made, a valve cage engaged into a side of the body for accessibility exteriorly of the body for insertion and removal thereof without disturbing the body installation, and having a bore therethrough affording communication between said inlet and outlet passages and formed for respectively seating relatively different diameter ball valves in tandem, a pair of relatively different diameter ball valves within said cage bore, and springs for respectively urging said valves against their seats, the spring for the smaller valve engaging the larger for conjointly influencing both valves.

3. A terminal check valve for a lubrication distribution pipe line comprising a body having inlet and outlet passages formed therein and with which, respectively, supply and delivery connections are made, a valve cage engaged into a side of the body for accessibility exteriorly of the body for insertion and removal thereof without disturbing the body installation and having a passage for controllably connecting the inlet and outlet passages, and spring-urged valve balls axially disposed and seating within the passage in said cage, of relatively different sizes and urged against their seats by springs of relatively different tension, adapting one spring to function in advance and independently of the second one spring interposed between the balls and bearing thereagainst to conjointly influence the same.

4. A terminal check valve for a lubrication distribution pipe line, comprising, a body having an inlet and an outlet passage and a chamber at the inner terminals of said passages, a tubular valve cage engaged into said chamber through an opening in the body, leading to the exterior thereof, the cage having its forward end formed for seating over the inner terminal of said inlet passage to seal the same from communicating with said chamber and bring the bore of the cage in communication with said passage, said bore formed for respectively seating relatively different diameter ball valves in tandem, different diameter ball valves within said cage bore, and springs respectively within the bore for urging said balls against their seats, one thereof interposed between the valves for conjointly influencing both valves.

ELMER O. COREY.